United States Patent [19]

Gott

[11] 4,088,981
[45] May 9, 1978

[54] AUTOMATED DATA ENTRY AND DISPLAY SYSTEM

[75] Inventor: Stephen P. Gott, Westport, Conn.

[73] Assignee: Citibank N.A., New York, N.Y.

[21] Appl. No.: 631,479

[22] Filed: Nov. 12, 1975

[51] Int. Cl.² ............................................. G06K 7/10
[52] U.S. Cl. ......................................... 340/146.3 SY
[58] Field of Search .............. 340/146.3 ED, 146.3 F, 340/146.3 SY, 146.3 Z, 324 R, 172.5; 445/1; 235/61.11 E; 250/568

[56] References Cited

U.S. PATENT DOCUMENTS

| | | | |
|---|---|---|---|
| 3,238,501 | 3/1966 | Mak et al. | 340/146.3 SY |
| 3,271,738 | 9/1966 | Kamentsky | 340/146.3 ED |
| 3,665,164 | 5/1972 | Beveridge et al. | 235/61.11 E |
| 3,735,350 | 5/1973 | Lemelson | 340/146.3 SY |
| 3,832,682 | 8/1974 | Brok et al. | 340/146.3 ED |
| 3,835,453 | 9/1974 | Narayanan | 340/146.3 SY |
| 3,903,517 | 9/1975 | Hafner et al. | 340/146.3 ED X |
| 3,958,235 | 5/1976 | Duffy | 340/324 R X |

OTHER PUBLICATIONS

Handheld Wand & Guide Mask-1200 Series – Keytronic Corp., Spokane, Wash. – 2M/051675A – 1975.

Primary Examiner—Harvey E. Springborn
Attorney, Agent, or Firm—Morgan, Finnegan, Pine, Foley & Lee

[57] ABSTRACT

The present invention relates to an automated data entry and display system. In this system a hand held photoelectric wand scans a document bearing alpha-numeric characters and reads these characters by generating electrical signals which correspond to the optical characteristics of the scanned information; the generated electrical signals are then input to a character recognition device where they are compared with stored reference characters and recognized; signals corresponding to the scanned alpha-numeric characters together with associated signals indicating acceptability or non-acceptability of each scanned character may then be transmitted to a display device where the acceptable and/or unacceptable scanned characters and designated diagnostic legends are displayed. In the system the electrical signals generated by the wand as a result of the scanning and reading of a given character are electrically identical to the electrical signals generated by a standard keyboard terminal when entering the given character. Thus, the wand is interchangeable in the system as an input device with a standard keyboard terminal and both types of input devices may simultaneously be utilized in the system. The system is capable of effecting automatically the reading, recognizing, displaying and entering for processing, characters of a variety of alpha-numeric fonts.

6 Claims, 4 Drawing Figures

AUTOMATED DATA ENTRY AND DISPLAY SYSTEM

BACKGROUND AND SUMMARY OF THE INVENTION

This invention relates to an integrated automated data entry and display system having a hand held portable alphanumeric character reading input device (wand), an optical character recognition unit and display apparatus.

Systems which combine wands, display devices and computer technology are now commercially available, e.g., the system described in U.S. Pat. No. 3,735,350. Such available systems provide significant advantages over the older methods and apparatus for data entry. Typically, these older methods of data entry involve an operator manually keying coded information onto computer or tab cards, into a display, directly into a computer processor or onto some computer related storage media such as magnetic tape or a disc. This manual keying operation is very time consuming and involves high risk of human error both in the initial coding of the information to be entered for display or processing and in the manual keying of the coded information.

Prior art wand systems have changed the manner of data entry for certain special types of information. In these prior art systems a wand is used to scan coded information (e.g., bar code) and to generate electrical signals which correspond to the optical characteristics of the scanned bar code. This technique greatly reduces the chances for error in data entry since an operator has only to move the wand across a document bearing the coded information of interest. Moreover, wand scanning is a much speedier procedure than having an operator read and then manually key the coded information.

The major limitation of these prior art wand display processing system is, of course, that they are only capable of entering for display and transmitting for processing previously coded information. Thus, these prior art systems cannot be used to read ordinary typed or printed documents such as reports, memoranda, letters, checks, bonds, etc. As the vast majority of documents that are routinely used in business are not in coded form but are simply typed or printed in humanly readable form, this is a severe limitation.

Recently, some attempts have been made to overcome this deficiency of prior art wand systems and to provide wands capable of photo-electrically reading humanly readable printed or typed characters. For example, the Keytronic 1200 Series Wand, now commercially available, is capable of generating electrical signals which correspond to the optical characters of ordinary printed or typed characters.

In addition, character recognition equipment which is capable of recognizing certain printed or typed characters is commercially available. However, most of the character recognition equipment available has been used not in conjunction with wand scanners but in combination with fixed scanning mechanisms into which the documents to be read are inserted.

Prior to the present invention, some wand-recognition unit systems were also available, but it is believed that these were limited in capability to reading and recognizing numeric information and some special alpha characters in the O.C.R.A. font.

It is believed that prior to the present invention, there has not been available any integrated automated data entry systems comprising a wand, recognition unit and associated display which are capable of automatically wand-reading, recognizing, displaying and transmitting full sets of alpha-numeric characters of various styles and fonts. Thus, the need for a system capable of wand-reading, recognizing and displaying alpha-numeric characters of various types and styles has gone unfulfilled.

The need for such a system and a method of utilizing it is especially acute in the banking industry. In banks at present, each day hundreds of thousands of checks, bonds and other paper are read and verified manually prior to various types of automatic processing. These types of papers normally contain various styles of printed or typed alpha-numeric information (e.g., payor, payee, face value, issuing bank, credit, debit, etc.). In some large banks the manual reading and verifying process now occupies literally thousands of clerical workers. It is thus an inordinately expensive procedure. In addition, the manual reading and verifying procedure involves high risk of human error. Many current banking operations also involve the keying of data appearing on bank paper (i.e., checks, bonds, etc.) prior to automatic processing. This manual process also is time consuming, expensive and is subject to high risk of human error.

Accordingly, it is an object of this invention to provide an integrated automated data reading, recognizing, entry and display system having a hand held wand for scanning and reading alpha-numeric character bearing documents, a character recognition unit, and associated display equipment whereby it will be possible to read, recognize, verify and display alpha-numeric characters of various styles and fonts by simply moving the wand across the documents bearing the characters of interest.

It is a further object of the invention to provide such an integrated system in which wand-scanning is able to effect the generation of a range of electrical signals corresponding to the scanned characters' optical characteristics the same as those generated by data entry of the scanned characters by ordinary keying of these characters on a standard computer keyboard terminal. This allows for the interchangeability of wands and keyboard terminals in the system of the present invention so that both wands and keyboard terminals may be used together in the system. In such a system when poor quality characters appear on a document to be scanned and as a result cannot be accurately photo-electrically read, they may be manually read and keyed in the conventional manner.

DETAILED DESCRIPTION OF A PREFERRED EMBODIMENT

Figure 1:
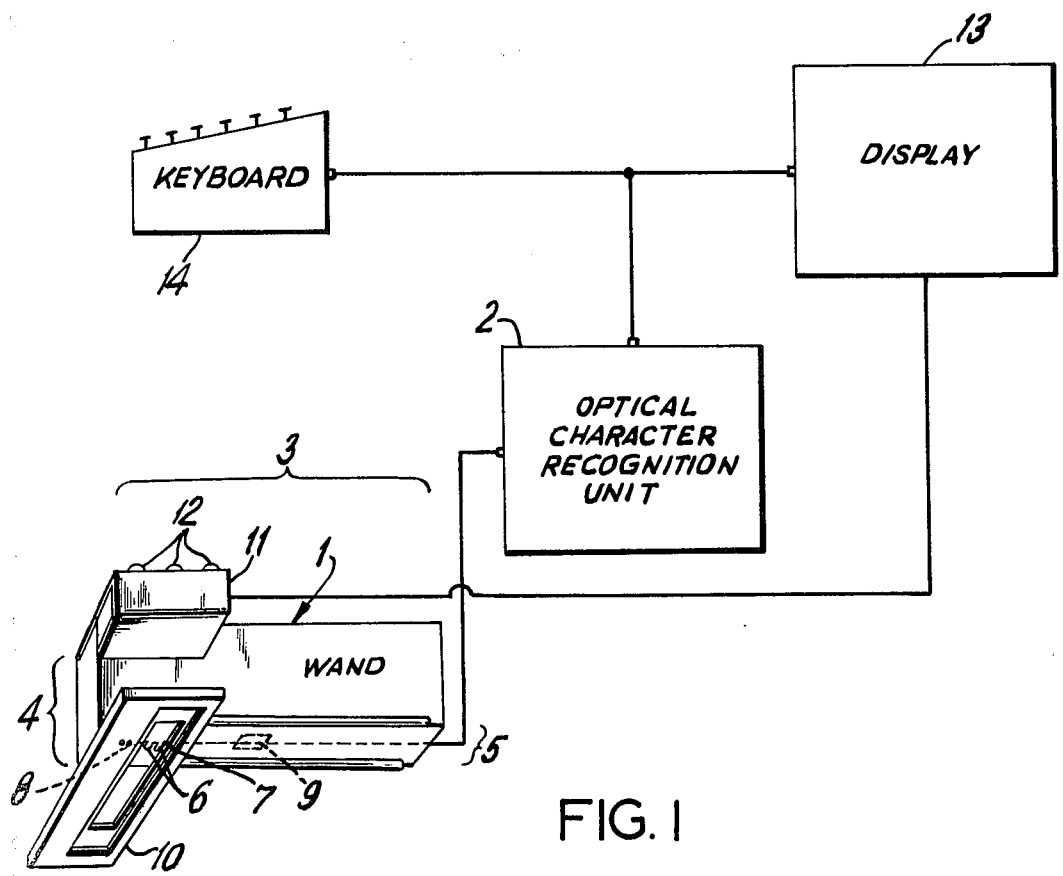
FIG. 1 is a schematic diagram, partly in perspective, illustrating the system of the present invention.

Referring to FIG. 1, a character scanning wand, 1, is electrically connected to an optical character recognition unit, 2. Preferably, the wand is the shape of a rectangular cylinder. It is adapted to be hand held and therefore should be approximately four to six inches in its length, 3, one to two inches in its height, 4, and approximately one inch along its width, 5. On the bottom surface of the wand are located incandescent light bulbs, 6, adapted to illuminate characters on a document scanned by the wand. Adjacent to these bulbs is a slit lens, 7, for receiving the light that is reflected by the scanned characters as a result of their illumination. Within the wand body are mounted on a single chip a column of preferably 64 photo-diodes or other photo-electric components, 8 (shown only schematically), which receive light patterns reflected by the scanned characters and convert the received light into corresponding electrical analog signals. Also located within the wand is a device for regulating the reading of the photo-electric components at discreet intervals which are a function of the linear distance scanned by the wand, such as a shaft angle encoder, 9 (shown only schematically). A shaft angle encoder is a conventional electro-mechanical device which generates electrical pulses at defined angular increments of shaft rotation. As used in the wand of the claimed system, it would generate electrical pulses at defined intervals which are a function of linear distance scanned by the wand (e.g., photo-diodes might be read 256 discreet times per linear inch scanned by the wand). An operator is able to effect reading of characters on a document by simply moving the wand across the characters on the document. Mounted on the bottom surface of the wand is a scanning guide, 10, which consists of a straight edge for aiding an operator in positioning the wand over a selected line on a document to be scanned. The characters reflect the light applied to them by the incandescent bulbs back through the slit lens to the column of photo-electric components. The photo-electric components convert the received reflected light into electrical signals corresponding to the scanned characters' optical characteristics (i.e., the distribution of light and dark in the scanned document area). Each discreet reading of the 64 photo-electric components effects the transmission of electrical signals to the optical character recognition unit which corresponds to the light-dark pattern of a 64 position vertical slice of the document area scanned. Since a series of such signals is generated a finite number of discreet times for each linear inch of scanning (e.g., 250 electrical signal generations for each linear inch of scanning), an electrical signal matrix (e.g., 64 × 250) is generated and transmitted to the optical character recognition unit by the wand for each linear inch that is scanned.

Figure 2:
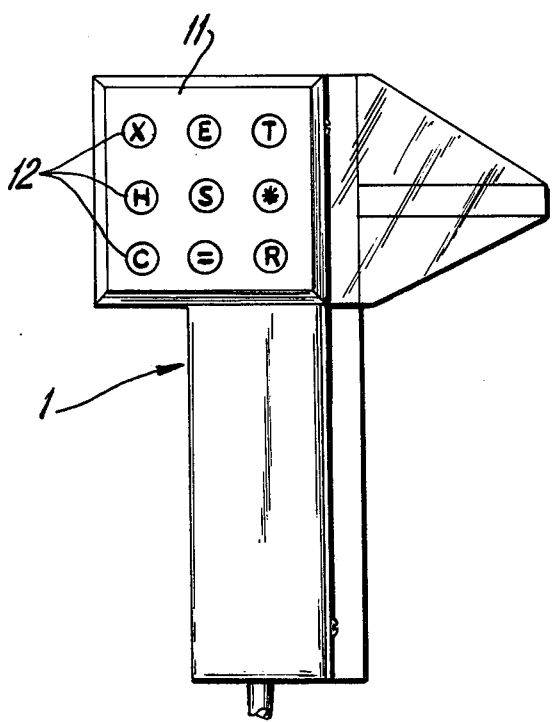
FIG. 2 is a schematic diagram illustrating the function control keys mounted on the wand of the system of the present invention.

Mounted on the wand is a small pad, 11, containing preferably nine miniature keys, 12, arranged to permit the operator to press any key with his index finger while using the wand. FIG. 2 is a suggested layout for such a pad. With the exception of an Enable Key and a Reset Key, all of the keys are capable of duplicating the functions of keys on a standard keyboard computer terminal (e.g., Control Data Corporation Series 400 Data Screen Terminal). The functions of the keys, depending on the application, could be as follows:

E — Enable — When pressed, enables wand output. When released, disconnects output and turns wand lamps off.

X — Transmit — Duplicates action of Xmit Key on Series 400 Data Screen Terminal keyboard.

T — Tab — Duplicates action of Tab Forward Key on Series 400 Data Screen Terminal keyboard.

H — Home — Duplicates action of Home Key on Series 400 Data Screen Terminal keyboard.

S — Sort — Generates a sort character.

.. — Generates a # character.

= .. — Generates an = character.

R — Reset — Erases characters in recognition unit buffer and prepares wand for scanning.

Each of these control buttons, when depressed, generate electrical signal code identical to the depression of a like marked key on a standard keyboard terminal such as a Series 400 Data Screen Terminal. The electrical signals generated by the wand function keys are transmitted directly to the display and effect the designated operations thereon.

Referring again to FIG. 1, the optical character recognition unit, 2, receives sequentially the analog electrical signals generated and transmitted to it by the scanning wand. The recognition unit first sequentially converts the received signals to digital signals (i.e., to 1 or 0 electrical bits which correspond respectively to dark and light spots on the scanned document area). Whether or not an analog signal is converted to a 1 or to a 0 bit depends upon the voltage level of the received analog signal which in turn depends upon the lightness or darkness of the corresponding scanned document area.

After this analog to digital signal conversion, the optical character recognition unit processes the generated digital signals in the following manner.

The digital electrical signals which are sequentially generated correspond to photo-diode column readouts and thus represent the light patterns reflected by vertical slices of the scanned document (each group of digital electrical signals which corresponds to one readout of the photo-diode column will be referred to as a digital electrical signal train). The digital electrical signal trains are tested sequentially to determine whether any of them contain an electrical 1 bit (which would indicate that part of a character is contained within the corresponding vertical slice of the scanned document). If two successive digital electrical signal trains contain 1 bits, the unit logic determines that a character is being scanned and makes an electrical decision to store electrically in a buffer all succeeding digital signal trains until two successive digital signal trains appear which do not contain 1 bits. These stored digital electrical signals trains define a matrix which corresponds to an unknown scanned character. The number of rows of this matrix equals the number of photo-diodes in the wand, e.g., 64. The number of stored digital electrical signal trains defines the number of columns in the matrix. The distribution of 0 to 1 bits in the stored electrical digital signal trains defines the entries in the matrix.

Also stored within the optical character recognition unit are electrical digital matrices which represent characters in a designated character set or font. A designated acceptable character set is electrically defined on a unique circuit card that can be inserted into and removed from the optical character recognition unit. A circuit card can be inserted which electrically stores a set of signal matrices which corresponds to any alpha-numeric font or style of interest. Thus, the optical character recognition unit is capable of recognizing virtually any alpha-numeric character.

The stored unknown character matrix is compared, bit by bit, to each character matrix in the designated acceptable character set, and for each comparison, the level of non-coincidence, i.e., the number of bits which do not match, is stored. After all comparisons are made, the character matrix in the designated acceptable character matrix set which is most similar to the unknown character matrix is selected as representing the unknown character. Then as a quality control check, the level of non-coincidence of this selected character matrix with the unknown character matrix is compared with a designated acceptable level of non-coincidence and a designated unacceptable level of non-coincidence. Based upon these final comparisons, one of the following occurs: electrical signals representing the character corresponding to the selected matrix are output to the display, 13 (preferably a Cathode Ray Tube), as being the unknown scanned character; a message is output indicating that the unknown scanned character is unrecognizable and the unknown character is rejected; or electrical signals representing the characters corresponding to the selected character matrix are output to the display as being the unknown scanned character, but with a diagnostic indicating some uncertainty as to the recognition. The character representing electrical signals output to the display for a given scanned character are identical to those input to the display by the keying of that given character on the keyboard terminal, 14. (This operation is explained below). Optical character recognition can be provided by conventional equipment such as the Compuscan Alpha Optical Character Recognition Unit.

It should be understood that recognition can also be accomplished by other known means for instance such as is described in U.S. Pat. No. 3,165,718, the above description merely being illustrative.

In keyboard display terminals used for data entry, the depression of a key results in a coded electrical signal which is sent to a computer. The computer may be a small simple one inside the terminal or a larger one outside the terminal which may be shared by a number of terminals. The coded electrical signal may be a series of eight electrical pulses on a single wire or a parallel set of voltages on, say, eight wires. The recognition unit generates signals identical to those generated by the keyboard and sends them to the same computer in the same way.

An example of a commercially available scanning wand which could be used in a system of the present invention is the Keytronic 1200 Series Wand. It is believed that prior to the present invention, wands such as the Keytronic 1200 Series Wand have not been available in systems capable of reading and recognizing full alpha-numeric sets of various styles and fonts. Similarly, prior to the present invention, optical character recognition units which are capable of recognizing full alpha-numeric sets of various styles or fonts, e.g., the Compuscan Alpha Optical Character Recognition Unit, have not been available in systems having wand input devices and have not been capable of accepting input from wand scanners.

Referring again to FIG. 1, after the generated digital character signals are processed by the optical character recognition unit and are determined to be acceptable or nonacceptable, they are transmitted to the display terminal, 13, to be displayed together with appropriate hardware generated diagnostic messages. A standard keyboard terminal, 14, is electrically connected to the display terminal and allows for manual keying of alpha-numeric characters into the display or to a computer (not shown) for processing. The output from the optical character recognition unit may also, if desired, be transmitted to an associated computer for processing.

Figure 3:
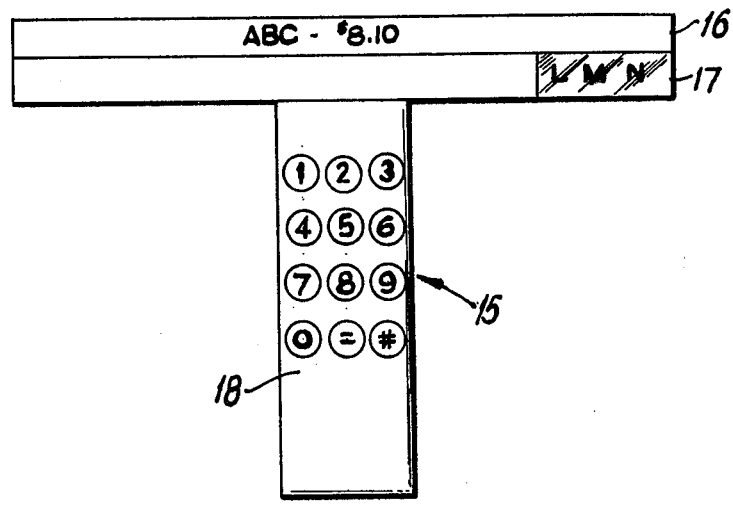
FIG. 3 is a schematic illustration of a wand of a preferred embodiment of the present invention.

FIG. 3 shows schematically a wand design of a preferred embodiment of the present invention. Mounted on this wand, 15, on the surface opposite to that of the illuminating bulbs, is a wand-display, 16 (this could be a cathode ray tube or other conventional display). This wand-display is adapted to be electrically connected to a computer and to receive control signals from the computer indicating the next field to be scanned, error signals and other information useful to an operator in scanning.

Also mounted on this surface of the wand is a transparent scanning window, 17, which allows the scanning operator to preview the characters being scanned before they are photo-electrically read. This allows for operator verification of wand read characters. Without the preview scanning window, the operator would not see the characters being photo-electrically read since the wand body would block his vision.

In addition, a keyboard, 18, may be mounted on the wand surface opposite to the scanning surface. This would give the wand the capability of inputting information photo-electrically or by conventional keyboard means and would eliminate the need for a separate keyboard console in the system, thus saving space.

Figure 4:
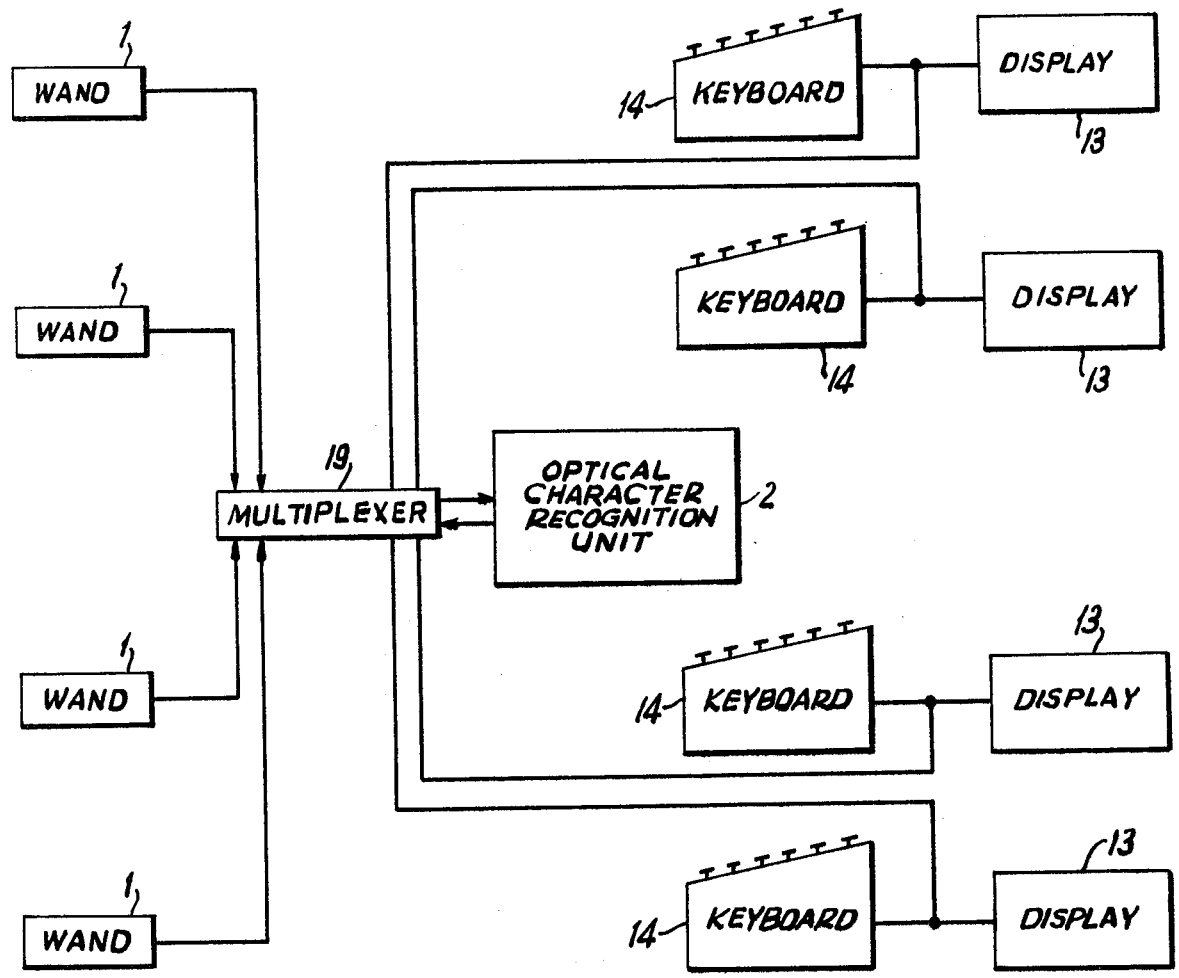
FIG. 4 is a schematic illustration of a system which is a preferred embodiment of the present invention and which comprises plural wands multiplexed to a single optical character recognition unit.

FIG. 4 shematically illustrates a preferred embodiment of the present invention in which several wands, 1, transmit signals to a single recognition unit, 2, and then to plural displays through a multiplex device, 19. The multiplex device is a switch which allows several wands to feed several keyboard displays via a single recognition unit.

What is claimed is:

1. An automated data entry and display system comprising:
    a. a wand having means for photo-electrically reading printed and typed alpha-numeric characters on a surface and for outputting electrical signals corresponding to the photo-electrically read characters;
    b. optical character recognition means electrically connected to the wand for receiving and recognizing electrical signals from the wand corresponding to any printed and typed alpha-numeric characters and for generating and transmitting electrical signals corresponding to the received recognized electrical signals;
    c. alpha-numeric keyboard electrical input means for transmitting electrical signals corresponding to designated alpha-numeric characters; and
    d. display means electrically connected to the alpha-numeric keyboard electrical input means and to the optical character recognition means for receiving electrical signals transmitted from said keyboard means and said optical character recognition means and for displaying for viewing designated symbols in response thereto.

2. An automated data entry and display system as claimed in claim 1, wherein display control keys are mounted on the wand and is electrically connected to the display means, each such key being adapted to generate and transmit to the display means electrical control signals and wherein said display means are adapted to receive said wand key signals and be responsive thereto.

3. An automated data entry and display system as claimed in claim 2, wherein the wand has mounted on it a display device adapted for electrical connection to display control means wherein at least some of the characters displayed by the display means are characters read by the wand.

4. An automated data entry and display system as claimed in claim 3, wherein the wand has located on it a window for previewing characters on a surface which are to be photo-electrically read by the wand.

5. An improved wand having means for photo-electrically reading printed and typed alpha-numeric characters on a surface and for outputting electrical signals corresponding to the photo-electrically read characters, wherein the improvement comprises display means mounted on the wand adapted for electrical connection to display control means wherein at least some of the characters displayed by the display means are characters read by the wand.

6. An automated data entry and display system comprising:
   a. plural wands each having means for photo-electrically reading printed and typed alpha-numeric characters on a surface and for outputting electrical signals corresponding to the photo-electrically read characters;
   b. means for electrically connecting each of said plural wands simultaneously to optical character recognition means;
   c. optical character recognition means electrically connected to each wand by said connecting means for receiving and recognizing electrical signals from each said wand corresponding to any printed and typed alpha-numeric characters of any designated set and for generating and transmitting electrical signals to display means corresponding to the received recognized electrical signals;
   d. plural display means electrically connected to the optical character recognition means for receiving electrical signals for displaying for viewing designated symbols in response thereto; and
   e. alpha-numeric keyboard electrical input means connected to said display means for transmitting electrical signals to display means corresponding to designated alpha-numeric characters associated with each of said plural display means.

* * * * *